US008473267B2

(12) United States Patent
Velázquez López et al.

(10) Patent No.: US 8,473,267 B2
(45) Date of Patent: Jun. 25, 2013

(54) COMPUTER-AIDED METHOD FOR A COST-OPTIMIZED CALCULATION OF VARIABLE DISTRIBUTIONS OVER AN AERODYNAMIC SURFACE

(75) Inventors: Angel Gerardo Velázquez López, Madrid (ES); Diego Alonso Fernández, Madrid (ES); José Manuel Vega de Prada, Madrid (ES); Luis Santiago Lorente Manzanares, Madrid (ES); Valentín De Pablo Fouce, Madrid (ES)

(73) Assignees: Airbus Operations, S.L., Madrid (ES); Universidad Politecnica de Madrid, Madrid (ES)

( * ) Notice: Subject to any disclaimer, the term of this patent is extended or adjusted under 35 U.S.C. 154(b) by 366 days.

(21) Appl. No.: 12/475,660
(22) Filed: Jun. 1, 2009
(65) Prior Publication Data
US 2010/0250212 A1      Sep. 30, 2010

(30) Foreign Application Priority Data

Mar. 31, 2009   (ES) .................................. 200900880

(51) Int. Cl.
*G06F 17/50* (2006.01)
*G06F 7/60* (2006.01)
*G06G 7/48* (2006.01)

(52) U.S. Cl.
USPC ................ 703/8; 703/2; 703/6; 703/7; 701/1; 701/3; 701/4; 701/13

(58) Field of Classification Search
USPC .......................... 703/2, 6, 7, 8; 701/1, 3, 4, 13
See application file for complete search history.

(56) References Cited

U.S. PATENT DOCUMENTS

| | | | | |
|---|---|---|---|---|
| 3,620,484 A | * | 11/1971 | Schoppe et al. | 244/130 |
| 6,113,034 A | * | 9/2000 | Basuthakur et al. | 244/166 |
| 6,216,063 B1 | * | 4/2001 | Lind et al. | 701/3 |
| 6,460,415 B1 | * | 10/2002 | Berman | 73/662 |
| 6,512,999 B1 | * | 1/2003 | Dimas et al. | 703/9 |
| 6,513,754 B1 | * | 2/2003 | Grove | 244/35 A |
| 6,527,221 B1 | * | 3/2003 | Kremeyer | 244/1 N |

(Continued)

OTHER PUBLICATIONS

Lorente et al. "Generation of Aerodynamic Databases Using High-Order Singular Value Decomposition", Jan. 2008.*
Agui et al. "Studies of interactions of a propagating shock wave with decaying grid turbulence: velocity and vorticity fields", J. Fluid Mech. (2005), vol. 524, pp. 143-195.*
Alauzet et al. "High Order Sonic Boom Modeling by Adaptive Methods", 2007.*
Arnal et al. "Laminar-Turbulent Transition and Shock Wave/Boundary Layer Interaction", 2005.*
Lorente L S et al: "Generation of aerodynamic databases using high-order singular value decomposition" Journal of Aircraft, AIAA, Reston, VA, US LNKD-DOI: 10.2514/1.35258, vol. 45, No. 5, Jan. 1, 2008, pp. 1779-1788, XP009119801. ISSN: 0021-8669.
Hong Luo, Joseph D. Baum, Rainald Löhner: "A fast, matrix-free implicit method for compressible flows on unstructured grids". Journal of Computational Physics, vol. 146, No. 2, Nov. 1, 1998, pp. 664-690 XP002601355.

*Primary Examiner* — Shambhavi Patel
(74) *Attorney, Agent, or Firm* — Ladas & Parry LLP

(57) ABSTRACT

A computer-aided method suitable for assisting in the design of an aircraft by providing a variable distribution V over an aircraft surface inside a predefined parameter space by means of a reconstruction of the results obtained through computations for an initial group of points in the parameter space using a CFD model comprising in each of said computations the following steps: a) Selecting relevant shock wave structures being defined by its thickness $\delta_{sw}$, its position $S_{sw}$ and the variable jump $\Delta V$; b) Decomposing said variable distribution V into a smooth variable distribution $V_{smooth}$ and a shock wave variable distribution $V_{jump}$ corresponding to said relevant shock wave structures; c) Obtaining the variable distribution V at any point of the parameter space as a reconstruction of the smooth variable distribution $V_{smooth}$ and the shock wave variable distribution $V_{jump}$ obtained for said point.

8 Claims, 10 Drawing Sheets

U.S. PATENT DOCUMENTS

| | | | |
|---|---|---|---|
| 6,721,682 B1* | 4/2004 | Moore et al. | 702/182 |
| 6,942,178 B2* | 9/2005 | Morgenstern et al. | 244/35 A |
| 7,063,288 B1* | 6/2006 | Kremeyer | 244/1 R |
| 7,641,153 B2* | 1/2010 | Smereczniak | 244/205 |
| 2002/0190164 A1* | 12/2002 | Loth et al. | 244/204 |
| 2004/0138853 A1* | 7/2004 | Tanahashi et al. | 702/179 |
| 2005/0116107 A1* | 6/2005 | Morgenstern et al. | 244/130 |
| 2005/0116108 A1* | 6/2005 | Morgenstern et al. | 244/130 |
| 2005/0121555 A1* | 6/2005 | Morgenstern et al. | 244/130 |
| 2006/0058985 A1* | 3/2006 | Arslan et al. | 703/2 |
| 2006/0226283 A1* | 10/2006 | Shepshelovich et al. | 244/35 R |

* cited by examiner

COMPUTER-AIDED METHOD FOR A COST-OPTIMIZED CALCULATION OF VARIABLE DISTRIBUTIONS OVER AN AERODYNAMIC SURFACE

FIELD OF THE INVENTION

The present invention refers to methods for assisting in the design of aerodynamic surfaces by making cost-optimized calculations of variable distributions such as the pressure distribution over them and more particularly to methods for assisting in the design of aircraft components.

BACKGROUND OF THE INVENTION

A common situation in practical industrial applications related to product development is the need to perform many surveys inside a space of state parameters. In the specific case of aeronautics, the calculation of the pressure distribution and/or other variable distributions over an aerodynamic surface is an important feature, in order to optimally design its structural components so that the weight of the structure is the minimum possible, but at the same time being able to withstand the expected aerodynamic forces.

Thanks to the increase of the use of the Computer Fluid Simulation Capability, nowadays, the calculation of the pressure distributions and/or other variable distributions over an aerodynamic surface is commonly done by solving numerically the Reynolds Averaged Navier-Stokes equations that model the movement of the flow around the surface, using discrete finite elements, finite differences or finite volume models. With the demand of accuracy posed in the aeronautical industry, each one of these computations requires important computational resources.

As the pressure distribution and/or other variable distributions over an aerodynamic surface depend on many different flight parameters, like angle of attack and Mach number, it is necessary to perform many lengthy and costly computations to obtain all the required information.

Some methods for calculating the pressure distributions and/or other variable distributions over the surface of an aerodynamic surface such as an aircraft wing, inside a defined parameter space, using Computational Fluid Dynamics (CFD) and interpolation are known in the prior art. In particular a known interpolation method is disclosed in the article "A Multilinear Singular Value Decomposition", Lieven De Lathauwer, Bart de Moor and Joos Vandewalle. SIAM *J. Matrix Annal. Appl.* Vol. 21, No. 4, pp 1253-1278.

CFD is used to calculate the pressure distributions and/or other variable distributions in a predefined group of points of the parameter space. The shock wave phenomena causes difficulties at the interpolation step. Namely, the number of computations needed to accurately reproduce the shock wave phenomena must be larger than the quantity I/d, where I stands for the geometric distance between extreme positions of the shock wave (as the parameters are varied) and d stands for the thickness of the shock wave. However, regarding that, in typical aircraft wings, the thickness of shock waves is usually small and the parameter I can be of the order of the 50% of the chord length, the number of computations needed to perform the interpolation of the shock wave increases rapidly.

The present invention is intended to solve this drawback.

SUMMARY OF THE INVENTION

It is an object of the present invention to provide methods to be used in the design or analysis of an aircraft or an aircraft component for obtaining a given variable distribution over an aerodynamic surface inside a predefined parameter space taking into account the shock wave phenomena and minimizing the computational costs.

This and other objects are met by a computer-aided method that provides a variable distribution V over the surface of an aircraft or an aircraft component inside a predefined parameter space by means of a reconstruction of the results obtained through computations for an initial group of points in the parameter space using a CFD model in connection with a structured mesh defined on said surface, comprising in each of said computations the following steps:

Selecting relevant shock wave structures along mesh lines in the chord direction taking place between a first point and a last point in the mesh line, being defined by its thickness $\delta_{sw}$, its position $s_{sw}$ in the mid point between said first point and said last point and the variable jump $\Delta V$ between the last and the first point.

Decomposing said variable distribution V into a smooth variable distribution $V_{smooth}$ and a shock wave variable distribution $V_{jump}$ corresponding to said relevant shock wave structures.

Obtaining the variable distribution V at any point of the parameter space as a reconstruction of the smooth variable distribution $V_{smooth}$ and the shock wave variable distribution $V_{jump}$ obtained for said point from the values obtained in the previous step.

The variable distributions may comprise one or a combination of the following: the pressure distribution, the velocity components distribution, the mach number (euler computation) distribution, the friction components distribution, the temperature distribution, the density distribution, the energy distribution, the entropy distribution, the enthalpy distribution.

The parameter space may comprise any combination of the following parameters (if applicable to the aircraft or aircraft component being designed): the angle of attack, the Mach number, the sideslip angle, the wing aileron deflection angle, spoilers deflection, high lift devices deflection, canard deflection, landing gear deflected status, landing gear doors angle, APU inlet open angle, the vertical tailplane rudder deflection angle, the horizontal tailplane elevator deflection angle and the horizontal tailplane setting angle. The range of validity of said parameters is that of the aircraft typical flight envelope.

The above-mentioned method is applicable to the design of a classical aircraft formed by a cylindrical fuselage, wings in the centre fuselage either in the middle or high or low region of the fuselage, conventional tail or T-tail or Cruciform-tail or V-tail or H-tail or U-tail or canard and engines in the wing or at the rear fuselage and also to the design of a non-classical aircraft configuration like a blended wing body (BWB) or a flying wing.

Other characteristics and advantages of the present invention will be clear from the following detailed description of embodiments illustrative of its object in relation to the attached figures.

DETAILED DESCRIPTION OF THE INVENTION

This invention is intended to provide a variable distribution over an aerodynamic surface such as for instance an aircraft wing, inside a predefined parameter space, using Computational Fluid Dynamics (CFD), a special treatment of the shock wave structures, and interpolation. CFD is used to calculate the variable distributions in a predefined group of points of the parameter space. The special treatment of the shock wave according to this invention allows performing accurate calculations of the variable distribution over the aerodynamic surface while keeping small the number of CFD computations, which carries an important CPU time reduction. The interpolation allows obtaining the variable distribution over the aerodynamic surface at all points inside the parametric space not considered in the initial computations.

Although the method shall be preferably applied to a structured mesh, it can be also used with a different mesh (hybrid, unstructured or Cartesian for example) by means of a user defined method to interpolate CFD solutions from the defined mesh to a user defined structured mesh.

An embodiment of a method according to the present invention will now be described in reference to an example for obtaining the pressure distribution over the surface of a 3D-wing with two free parameters, angle of attack ($\alpha$), in the range $-3°$ to $+3°$, and Mach number (M) in the range 0.40 to 0.80.

The pressure distribution over the surface of the wing will be firstly calculated for an initial group of points in the parametric space given by the following values:

$\alpha = -1.50°, -1.00°, -0.50°, 0.00°, +0.50°, +1.00°, +1.50°$
M=0.80, 0.81, 0.83, 0.85

Then, the pressure distribution in any point of the parametric space can be obtained by interpolation. The test points in which the pressure distribution will be interpolated from the results obtained are:

$\alpha = -1.25°, -0.75°, -0.25°, +0.25°, +0.75°, +1.25°$
M=0.82, 0.84

Computation for the Initial Group of Points in the Parametric Space

Step 1: Computation via CFD of the pressure distribution over the wing surface 11 for the initial group of points in the parametric space.

Figure 1:
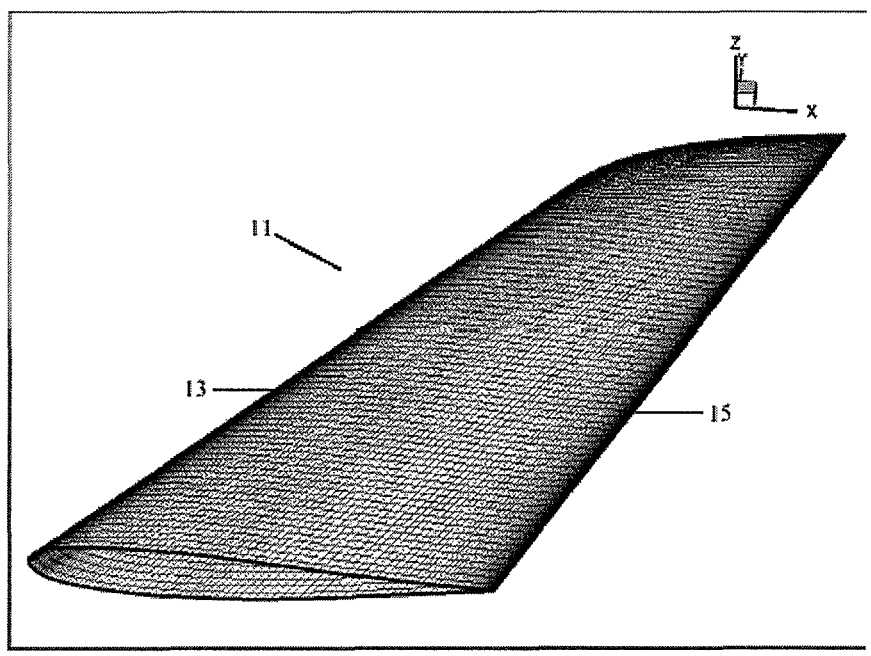
FIG. 1 shows the structured mesh defined over a wing surface which is used in a method according to this invention for the CFD calculations.

In each computation it is obtained the value of the pressure in each point of a structured mesh defined over the wing surface such as the mesh shown in FIG. 1.

The mesh is parameterized by two integer variables u and v. The mesh lines that go from the leading edge 13 to the trailing edge 15 are lines where v=constant and the mesh lines that extend over the span wise direction are such that u=constant.

Shock Wave Treatment:

Identification of the shock wave is made for all computations of said initial group of points. The pressure and the suction sides are treated separately. The flow just over the surface is a subsonic flow. Therefore it is impossible to find out shock waves attached to the wing surface. However, as a consequence of the presence of shock waves inside the fluid domain, just above the surface, pressure distribution is quite steep in some regions of the wing. These regions are called hereinafter shock waves. The shock wave in the surface of the 3D wing 11 is characterized in each mesh line along the chord as shown in FIG. 2 by three parameters that depend on the span wise dimension coordinate, namely, the pressure jump in the shock wave ($\Delta P$), the shock wave position in terms of arc length measured from the leading edge ($s_{SW}$) and the shock wave thickness ($\delta_{SW}$). These three quantities are of the form:

$$\Delta P = \Delta P(v; \text{parameters}) \qquad (1)$$

$$s_{SW} = s_{SW}(v; \text{parameters}) \qquad (2)$$

$$\delta_{SW} = \delta_{SW}(v; \text{parameters}) \qquad (3)$$

where parameters stands for those parameters that identify each computation inside the parameter space. As it was already said, the parameters considered in the above-mentioned example are the angle of attack ($\alpha$) and the Mach number (M).

Thus the original pressure distribution is decomposed into two parts, a smooth distribution and a distribution associated with the shock waves:

$$P = P_{smooth} + P_{jump} \qquad (4)$$

Figure 2A:
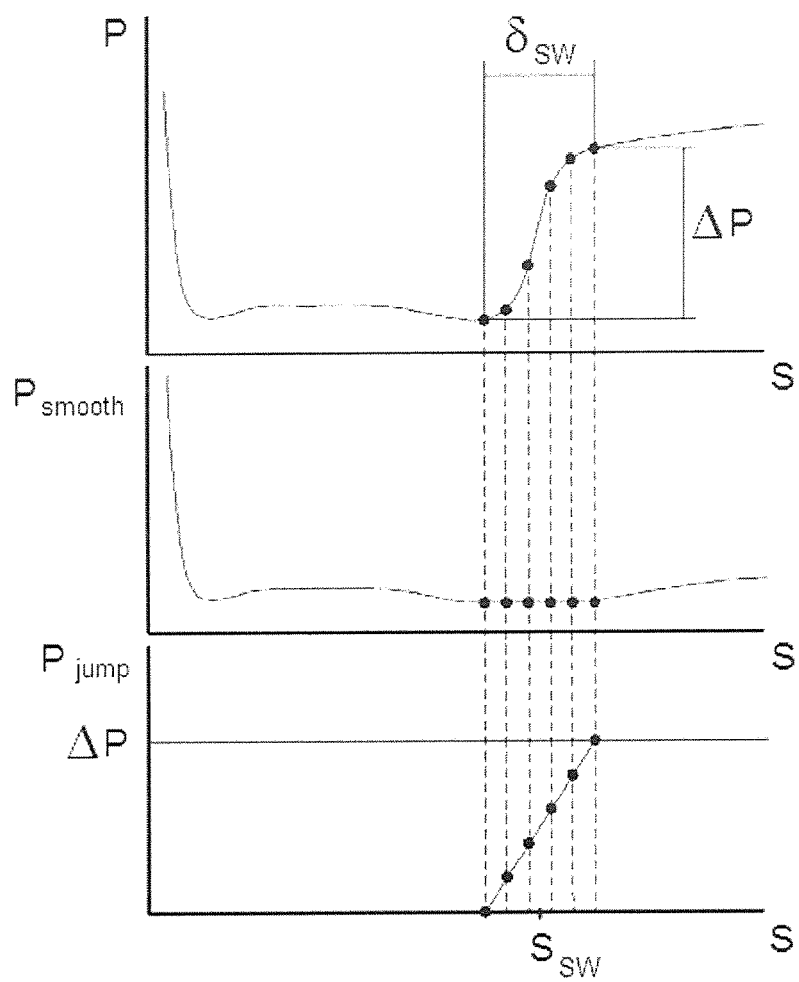
FIGS. 2*a* and 2*b* illustrate the three parameters used in the method according to this invention for characterizing a shock wave of, respectively, linear and sinusoidal shape.
Figure 2B:
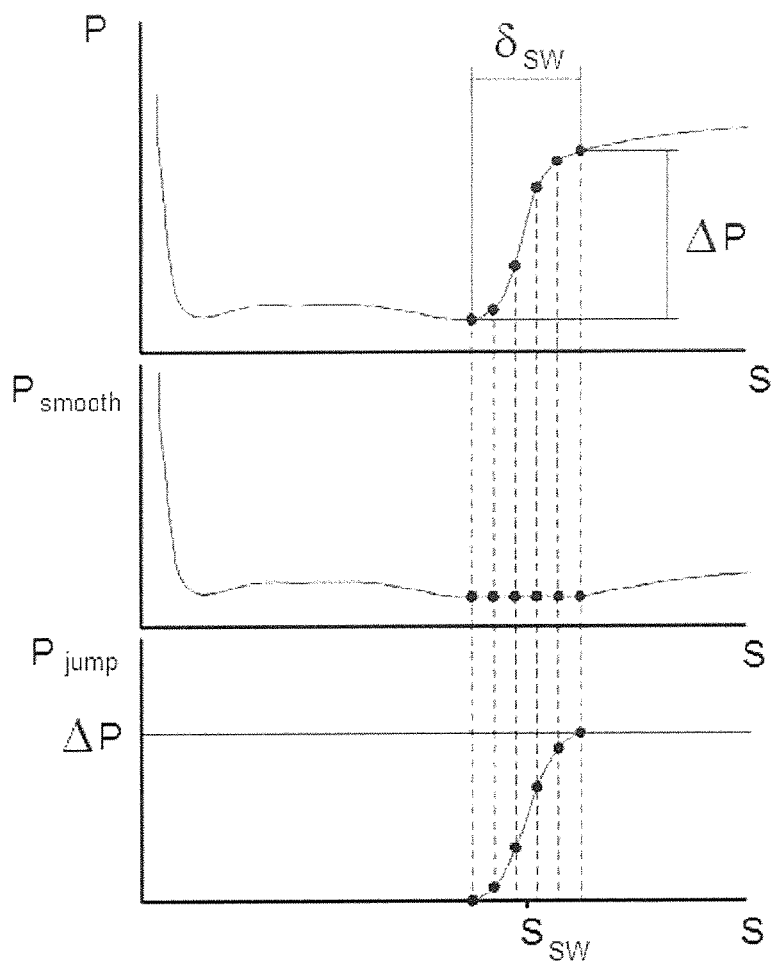

This decomposition can be made considering a shape of the shock wave defined by the user. It can be a linear shape as shown in FIG. 2a or a sinusoidal shape as shown in FIG. 2b.

Figure 3:
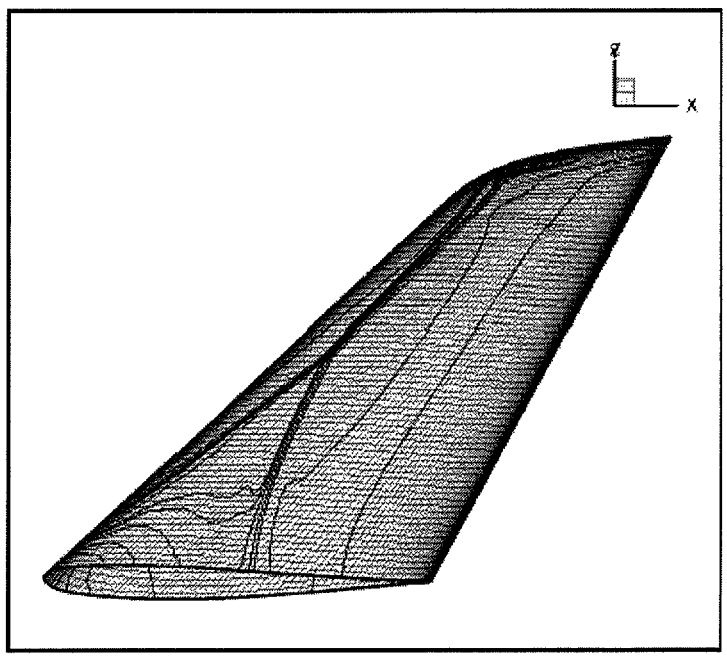
FIG. 3 is the wing surface of FIG. 1 including pressure iso-lines corresponding to "λ"-shape shock wave structures.

Furthermore, two (or more) shock waves can co-exist in the same mesh line v=constant because, in 3D wings, "$\lambda$"-shape shock wave structures are common as can be observed in the pressure iso-lines plotted in FIG. 3 that correspond to the computation of the example being considered.

Thus, the method must be able to deal with two (or more) shock waves in the same mesh line. In fact, the method considers that there are "always" two (or more) shock waves. For two shock wave case the shock wave number one is that one that is the closest to the leading edge and the shock wave number two is the other one. When there is only one shock wave, the shock wave is split into two shock waves with the same position and the same thickness but with a $\Delta P$ that is a half of the original $\Delta P$. This is done to avoid discontinuities and to facilitate interpolation, which will be a part of the process.

To show explicitly the shock wave identification and disassembly, in the example being considered the method will be applied step by step to two different lines v=20 and v=40 for the computation corresponding to M=0.85 and $\alpha$=+1.5°.

(Steps 2-9 are performed for each computation)

Step 2: Obtention of the derivative $$\frac{dP}{ds}$$

following the mesh lines v=constant, where P stands for pressure and s for arc length.

Figure 4:
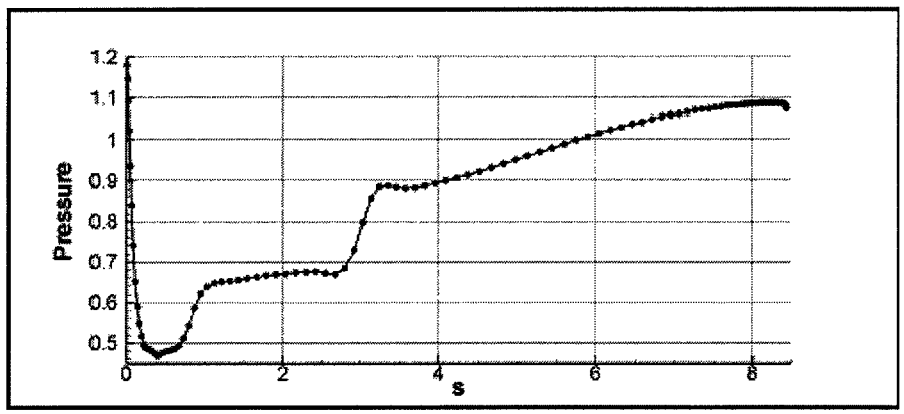
FIGS. 4-9 illustrate different features of the pressure distribution along a mesh line with two shock waves.
Figure 10:
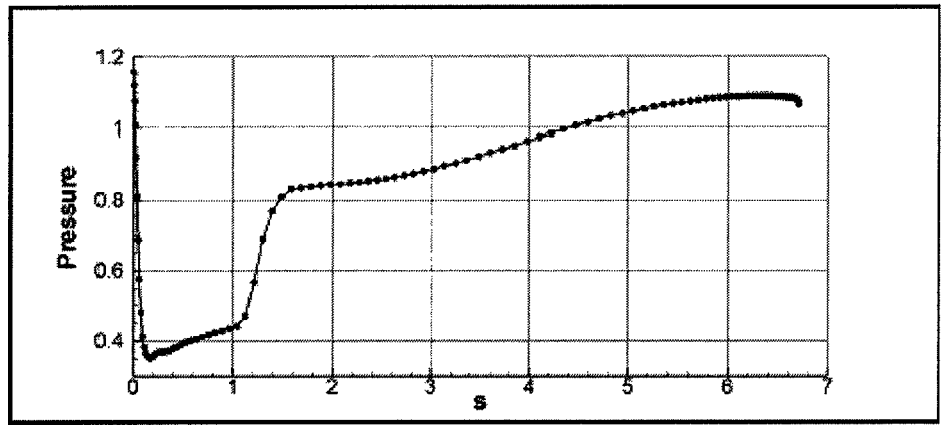
FIGS. 10-16 illustrate different features of the pressure distribution along a mesh line with one shock wave.

The CFD pressure distribution in the first line (v*=20), illustrated in FIG. 4 shows that there are two different shock waves. The CFD pressure distribution in a second line (v*=40), illustrated in FIG. 10 shows that there is only one shock wave.

Figure 5:
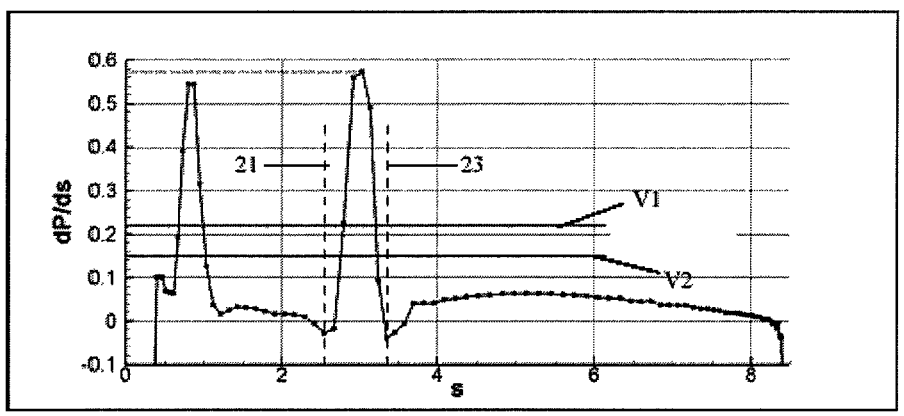

The distribution of $$\frac{dP}{ds}$$

over the first line ($v^*=20$) is illustrated in FIG. 5.

Figure 11:
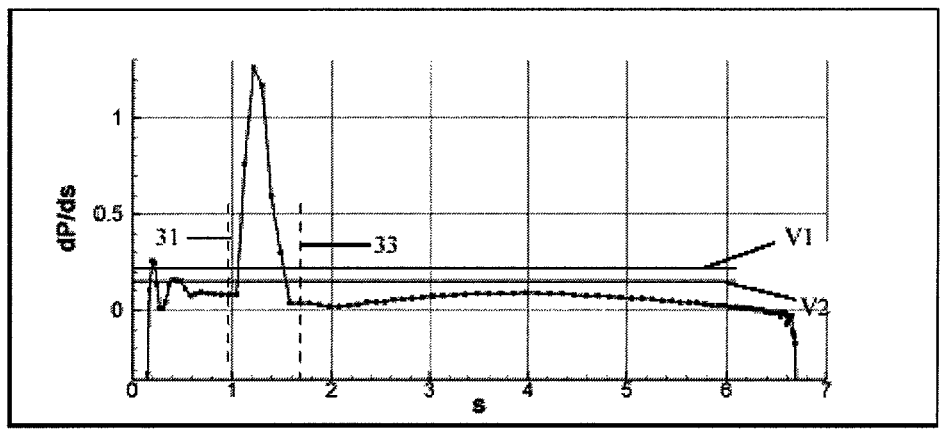

The distribution of $$\frac{dP}{ds}$$

over the second line ($v^*=40$) is illustrated in FIG. 11.
(Steps 3-9 are performed for each line v=constant. We will show the results obtained in the example being considered for both lines $v^*=20$ and $v^*=40$)

Step 3: Seek for the maximum value of $$\frac{dP}{ds}.$$

3a) If the maximum value of $$\frac{dP}{ds}$$

were smaller than a predetermined value P1 (P1=0.22 in the example being considered), it would be assumed that no shock wave would exist in this line. Then pressure jumps would be $\Delta P_1(v^*;\alpha^*,M^*)=0$ and $\Delta P_2(v^*;\alpha^*,M^*)=0$, while the position and thickness of the shock wave remain undefined. Repeat Step 3 for the next line.

3b) If the maximum value of $$\frac{dP}{ds}$$

is larger than P1, which is the case for both lines $v^*=20$ and $v^*=40$, proceed to Step 4.

Step 4: Definition of the shock wave structure as the set of all the mesh points around the maximum value of $$\frac{dP}{ds} \text{ where } \frac{dP}{ds}$$

is larger than a predetermined value P2 (P2=0.15 in the example being considered) plus two additional mesh points at each side of the interval.

In FIG. 5 it has been highlighted for line $v^*=20$ the region affected by the shock wave between the two dashed lines 21, 23, namely, all the mesh points where $$\frac{dP}{ds}$$

is larger than P2 plus two additional mesh points added at each side of the interval.

In FIG. 11 it has been highlighted for line $v^*=40$ the region affected by the shock wave between the two dashed lines 31, 33, namely, all the mesh points where $$\frac{dP}{ds}$$

is larger than P2 plus two additional mesh points.

Step 5: Definition of the shock wave position as the mid point of the shock wave structure obtained in step 4.

Step 6: The pressure jump in the shock wave is defined as the pressure difference between the last and the first point of the shock wave structure.

6a) If the pressure jump is smaller than a third predetermined value P3 (P3=0.080 in the example being considered) it is assumed that there is no shock wave in this line; thus, $\Delta P_1(v^*;\alpha^*,M^*)=0$ and $\Delta P_2(v^*;\alpha^*,M^*)=0$ is set, while the position and thickness of the shock wave remain undefined. Go to Step 3 for the next line.

Figure 6:
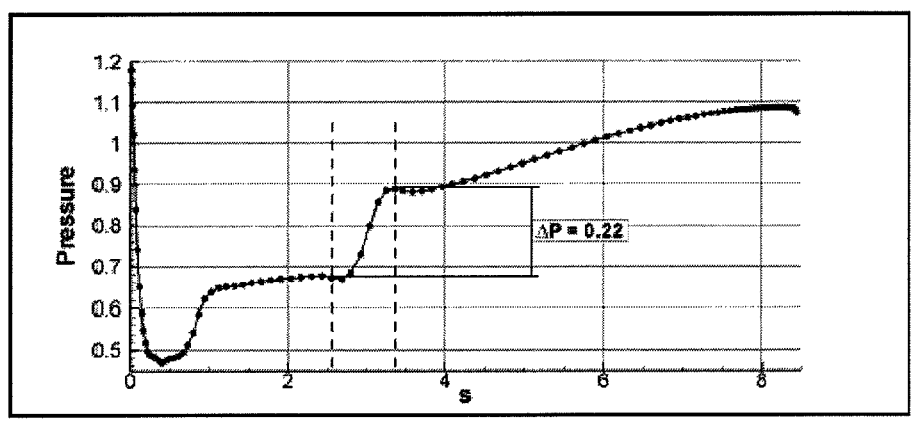

6b) If the pressure jump is greater than P3, which is the case illustrated in FIG. 6, then it is considered that there is a shock wave with the characterizing parameters calculated as defined above.

As can be observed in FIG. 6, for line $v^*=20$,

ΔP=0.22>P3=0.08 and thus a shock wave exists whose characterizing parameters have been just calculated.

Figure 12:
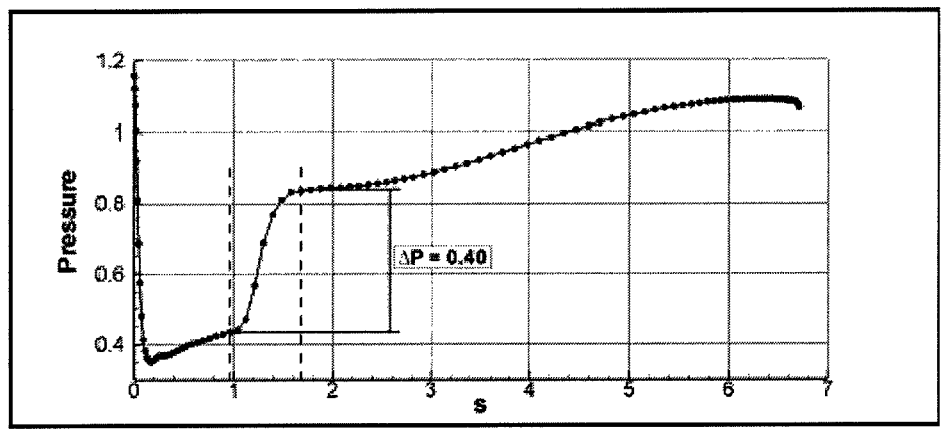

As can be observed in FIG. 12 for line $v^*=40$,

ΔP=0.40>P3=0.08 and thus a shock wave exists whose characterizing parameters are $\Delta P=0.40$, $s_{SW}=1.32$ and $\delta_{SW}=0.72$.

Step 7: Excluding the zone affected by the shock wave just detected, repeat from Step 3 to Step 6 to detect a possible second shock wave.

Figure 7:
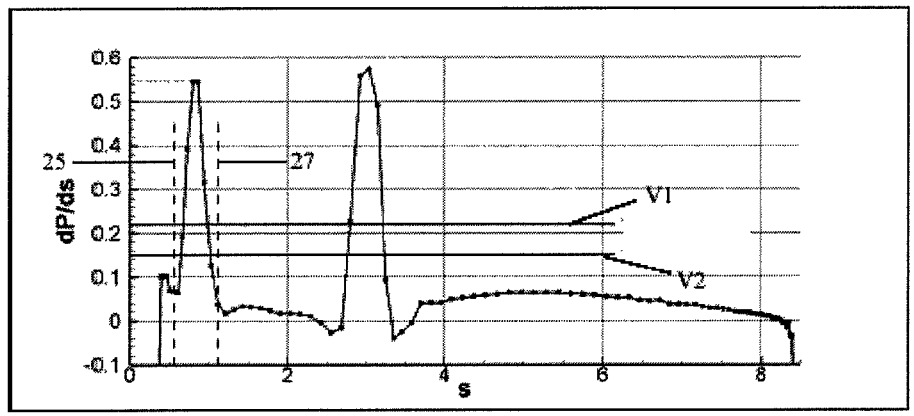
Figure 8:
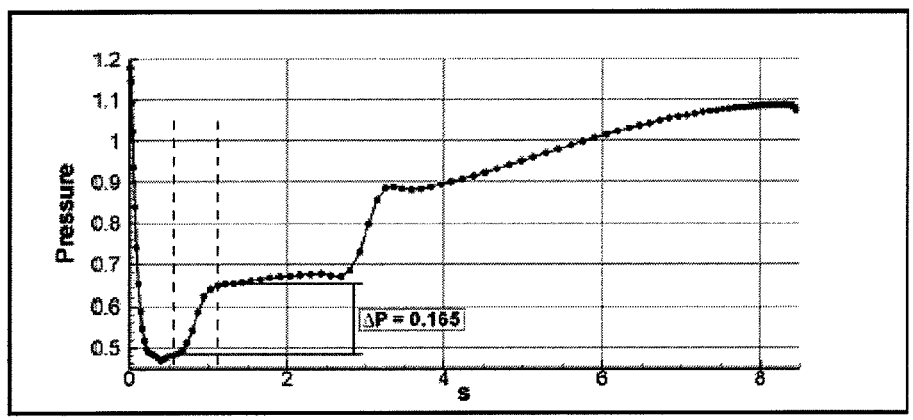

For line $v^*=20$ FIG. 7 shows the zone affected by a second shock wave as the region in between of the dashed lines 25, 27. As illustrated in FIG. 8, the pressure jump in this case $\Delta P=0,165$ is greater than P3, thus, it is concluded that there are two shock waves in this line $v^*=20$.

Figure 13:
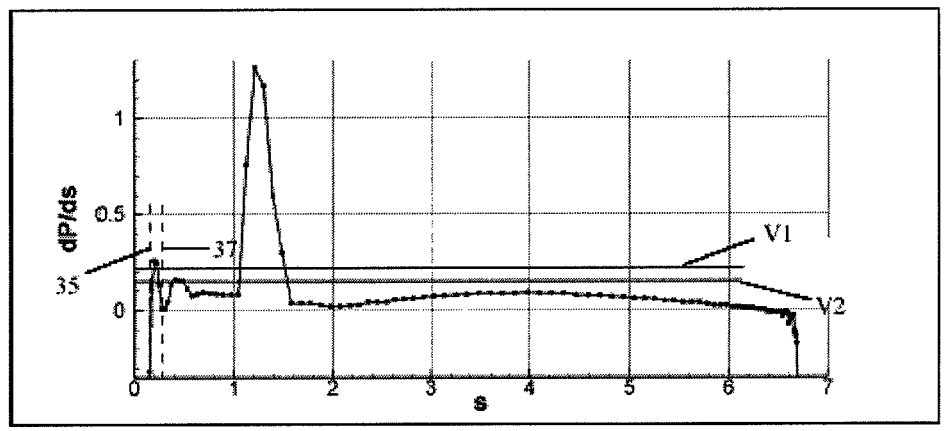
Figure 14:
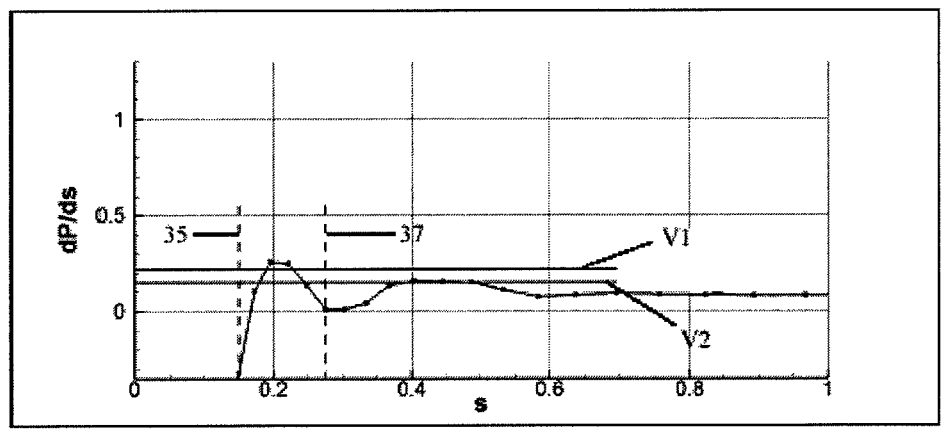
Figure 15:
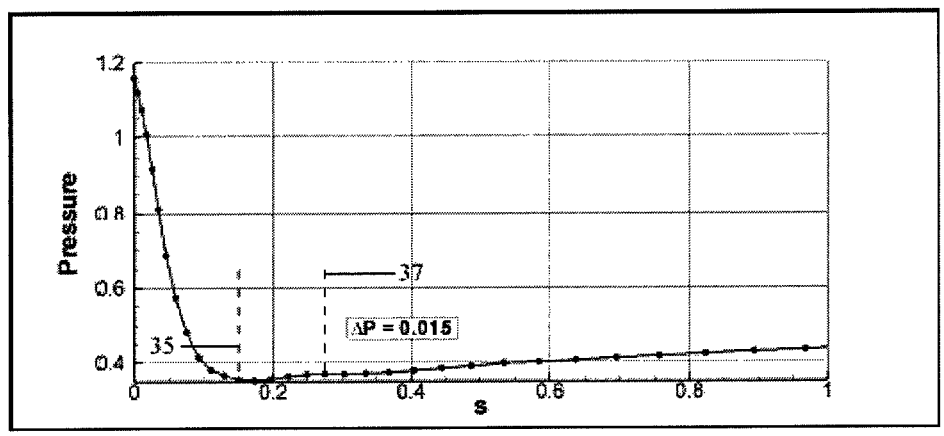

For line $v^*=40$, as shown in FIGS. 13 and 14 the maximum of the $$\frac{dP}{ds}$$

derivative (after excluding that zone affected by the firstly detected shock wave) is compared with P1. In this case, the maximum value of $$\frac{dP}{ds}$$

is larger than P1, and thus, Step 4 and 5 are addressed. Once the zone affected by the shock wave (the zone between the dashed lines 35, 37) has been defined, the pressure jump is computed. As illustrated in FIG. 15 the pressure jump through the shock wave is $\Delta P=0.015<P3=0.08$. According to Step 6a), there is no shock wave in this position.

Step 8: Depending on the existence of one or two shock waves:

8a) If there is only one shock wave with characterizing parameters $\Delta P$, $s_{SW}$ and $\delta_{SW}$, the shock wave is split into two shock waves with the same position and thickness but with a pressure jump equal to a half of the total value:

$$\Delta P_1(v^*;\alpha^*,M^*)=\Delta P_2(v^*;\alpha^*,M^*)=\Delta P/2 \quad (5)$$

$$s_{1_{SW}}=s_{2_{SW}}=s_{SW} \quad (6)$$

$$\delta_{1_{SW}}=\delta_{2_{SW}}=\delta_{SW} \quad (7)$$

For line v*=40 there is only one shock wave. The shock wave is split into two shock waves with the same positions and thicknesses but with pressure jumps equal to a half of the total pressure jump. The characterizing parameters of both shock waves are:

Shock wave #1: $\Delta P_1$=0.20, $s_{SW_1}$=1.32 and $\delta_{SW_1}$=0.72.
Shock wave #2: $\Delta P_2$=0.20, $s_{SW_2}$=1.32 and $\delta_{SW_2}$=0.72.

8b) If there are two shock waves, the shock wave that is closest to the leading edge is named as shock wave #1 and the other shock wave as shock wave #2.

In the example being considered for line v*=20 the shock wave #1, which is closest to the leading edge, is the shock wave detected in second place, whereas the shock wave detected in first place is the shock wave #2. Thus, the characterizing parameters of the two shock waves are:

Shock wave #1: $\Delta P_1$=0.165, $s_{SW_1}$=0.84 and $\delta_{SW_1}$=0.56.
Shock wave #2: $\Delta P_2$=0.220, $s_{SW_2}$=2.95 and $\delta_{SW_2}$=0.80.

Step 9: Disassembling of the two shock waves line by line in the smooth pressure distribution and the shock wave pressure distribution.

Figure 9:
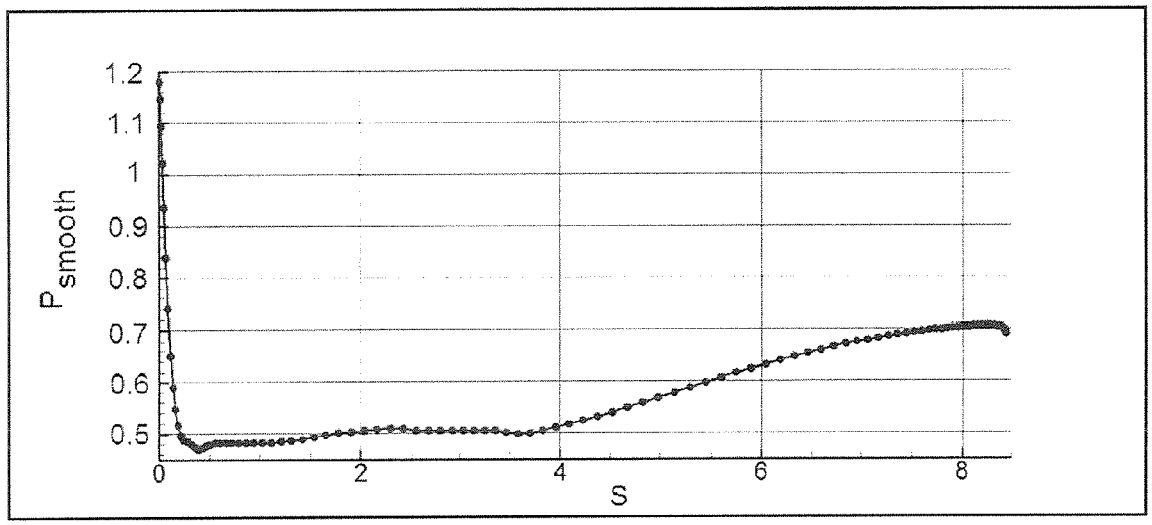

For line v*=20, the smoothed pressure profile is showed in FIG. 9.

Figure 16:
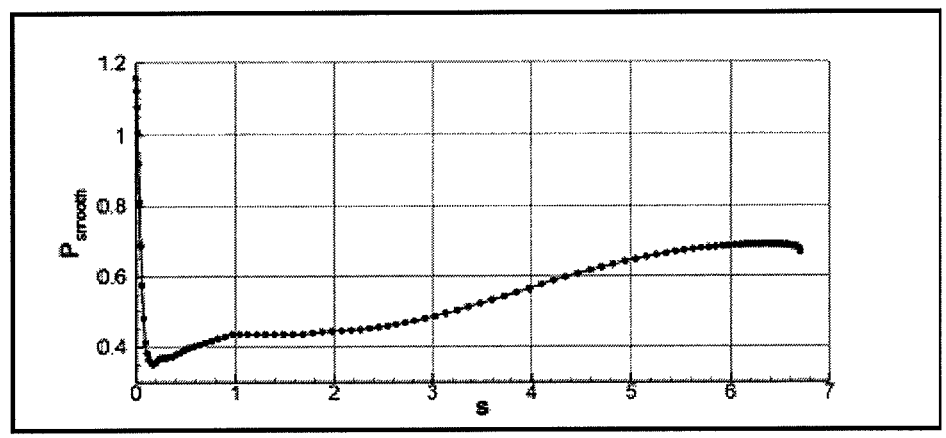

For line v*=40 the smoothed pressure profile is showed in FIG. 16.

Interpolation:

Step 10: Point by point, interpolation (by a user defined method) of the smooth pressure distribution at any point of the parameter space.

Step 11: Interpolation of the shock wave pressure distribution for each shock wave in the parameter space.

Step 12: When there is no shock wave, the position and thickness are both undefined. This problem is overcome using two new parameters, $\Delta Pxs_{sw}$ and $\Delta Px\delta_{sw}$. These two parameters are set to zero when there is no shock wave. Interpolation of these two new parameters in the parameter space.

Step 13: Once the smooth pressure distribution and the shock wave pressure distribution are determined at a point of the parameter space, assembly of both distribution is made to reconstruct the whole pressure distribution.

Results

The results in terms of mean error (ME) of the reconstruction in the example being considered with respect to a CFD computation are presented in the next table for a set of test points in the parameter space, where the ME is defined as follows:

$$ME(\%) = \frac{\sum_{i=1}^{I_{max}}\sum_{j=1}^{J_{max}}|error_{ij}|}{I_{max} \times J_{max}} \times \frac{1}{P_{max}-P_{min}} \times 100 \quad (8)$$

where i and j are the indexes that identify each point inside the mesh and $I_{max}$ and $J_{max}$ are the total number of points in each direction. Note that the error is referred to the total variation of the pressure in each test point.

| Test points | | |
|---|---|---|
| α (°) | M | ME (%) |
| −1.25 | 0.82 | 0.21 |
| −0.75 | 0.82 | 0.19 |
| −0.25 | 0.82 | 0.33 |
| +0.25 | 0.82 | 0.43 |
| +0.75 | 0.82 | 0.40 |
| +1.25 | 0.82 | 0.62 |
| −1.25 | 0.84 | 0.23 |
| −0.75 | 0.84 | 0.23 |
| −0.25 | 0.84 | 0.48 |
| +0.25 | 0.84 | 0.34 |
| +0.75 | 0.84 | 0.37 |
| +1.25 | 0.84 | 0.53 |

Figure 17:
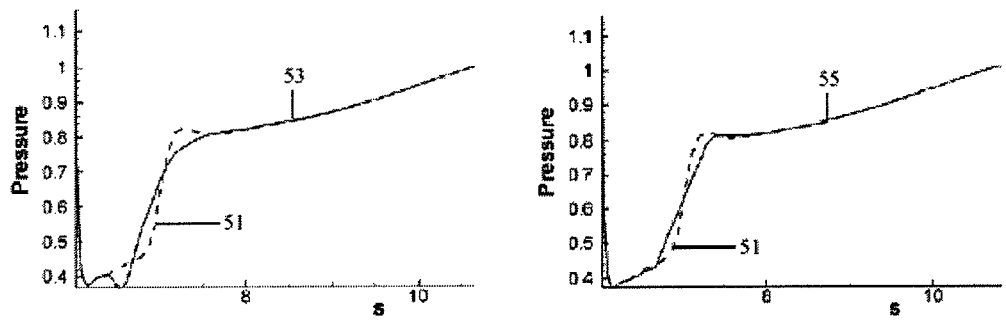
FIGS. 17 and 18 illustrate the improvements obtained with the method according to this invention.
Figure 18:
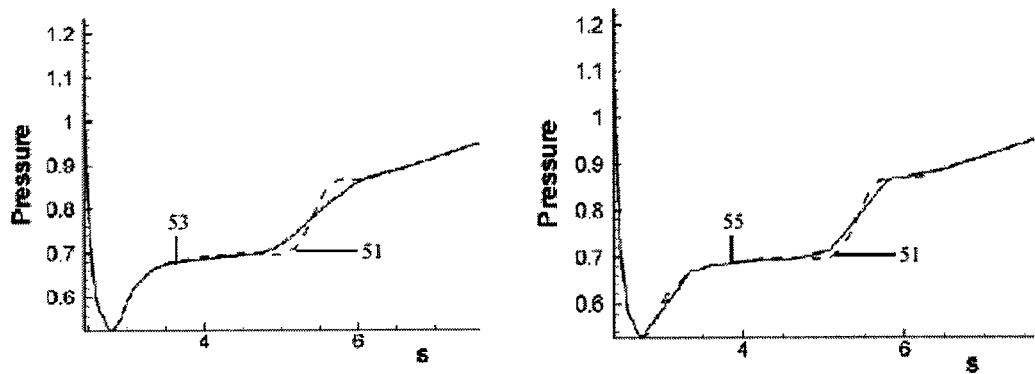

The improvements obtained with the method according to this invention with respect to the prior art are illustrated in FIGS. 17 and 18 showing two comparative examples of the pressure distribution 53 obtained according to a known High Order Single Value Decomposition (HOSVD)+interpolation method and the pressure distribution 55 obtained including the shock wave treatment according to this invention with respect to the CFD distribution 51. As it can be seen the shock wave treatment improves the quality of final results.

Modifications may be introduced into the preferred embodiment just set forth, which are comprised within the scope defined by the following claims.

The invention claimed is:

1. A computer-aided method suitable for assisting in the design or analysis of an aircraft by providing a variable distribution V over the three dimensional surface of an aircraft or an aircraft component inside a predefined parameter space by means of a reconstruction of the results obtained through computations for an initial group of points in the parameter space using a CFD model in connection with a structured mesh defined on said three dimensional surface, characterized in that in each of said computations it comprises the following steps:

a) Selecting at least one shock wave structure along a mesh line in the chord direction said shock wave structure extending between a first point and a last point in the mesh line, said shock wave being defined by its thickness $\delta_{sw}$, its position $s_{sw}$ in the mid point between said first point and said last point and the variable jump ΔV between the last and the first point;

b) Decomposing said variable distribution V obtained through computations for an initial group of points into a smooth variable distribution $V_{smooth}$ component b)... and a shock wave variable distribution $V_{jump}$ component corresponding to said at least one shock wave structure;

c) Obtaining the variable distribution V at a point of the parameter space other than one included in said initial group of points by combination of the smooth variable distribution $V_{smooth}$ component and the shock wave variable distribution $V_{jump}$ obtained for said point from the values obtained in step b).

2. The computer-aided method according to claim 1, characterized in that said step a) comprises the following substeps:

a1) seeking the maximum value of dV/ds along said mesh line, s being the arc length measured from the leading edge of the aerodynamic surface and finding that it is larger than a first predetermined value P1;

a2) setting the amplitude of the shock wave as a thickness value around the mesh corresponding to the maximum value of dV/ds where dV/ds is larger than a second predetermined value P2 plus two additional points at each side of maximum dV/ds;

a3) considering said shock wave if the variable jump ΔV is greater than a third predetermined value P3.

3. The computer-aided method according to claim 1, characterized in that when only one shock wave is taken into account it is split into two shock waves with the same position $s_{sw}$, and thickness $\delta_{sw}$ and with the variable jump ΔV equal to half the total value.

4. The computer-aided method according to claim 1, characterized in that the shape of the shock wave variable distribution $V_{jump}$ is a linear shape.

5. The computer-aided method according to claim 1, characterized in that the shape of the shock wave variable distribution $V_{jump}$ is a non-linear shape.

6. The computer-aided method according to claim 1, characterized in that said variable distribution V is one or a combination of the following: the pressure distribution, the velocity components distribution, the mach number (euler computation) distribution, the friction components distribution, the temperature distribution, the density distribution, the energy distribution, the entropy distribution, the enthalpy distribution.

7. The computer-aided method according to claim 1, characterized in that said predefined parameter space includes one or more of the following parameters: angle of attack, Mach number, sideslip angle, wing aileron deflection angle, spoilers deflection, high lift devices deflection, canard deflection, landing gear deflected status, landing gear doors angle, APU inlet open angle, the vertical tailplane rudder deflection angle, the horizontal tailplane elevator angle, the horizontal tailplane setting angle.

8. The computer-aided method according to claim 1, characterized in that said aircraft component is one of the following: a wing, an horizontal tailplane, a vertical tailplane, fuselage, a high lift device, a spoiler, an engine, a canard.

* * * * *